UNITED STATES PATENT OFFICE.

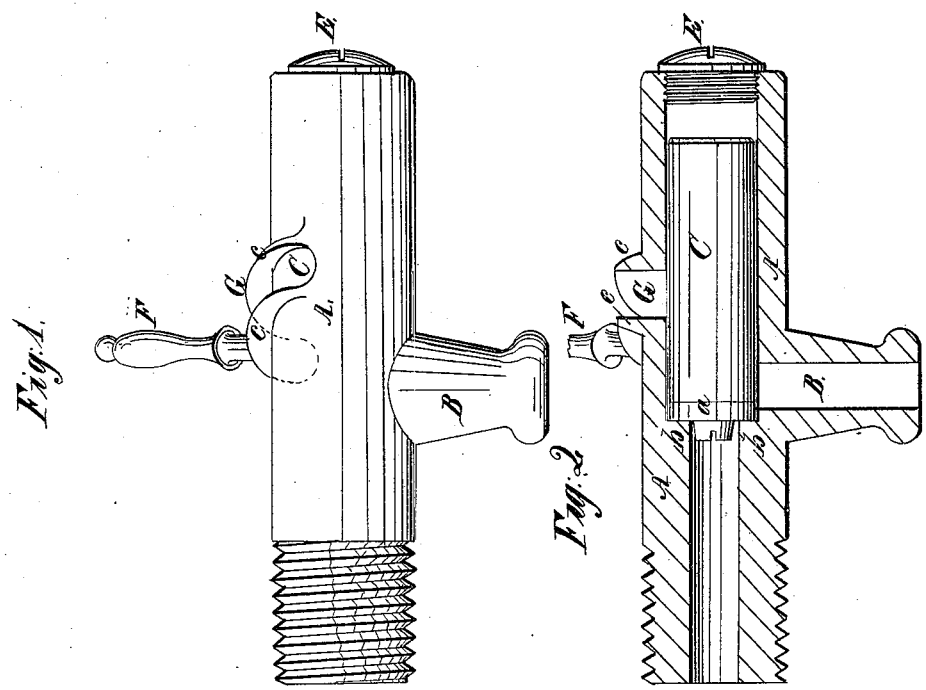
E. Duchamp,
Faucet,
N° 25,397. Patented Sep. 13, 1859.

EUGÈNE DUCHAMP, OF ST. MARTINSVILLE, LOUISIANA.

FAUCET.

Specification of Letters Patent No. 25,397, dated September 13, 1859.

*To all whom it may concern:*

Be it known that I, EUGÈNE DUCHAMP, of St. Martinsville, in the parish of St. Martins and State of Louisiana, have invented a new and useful Improvement in Faucets; and I do hereby declare that the following is a full, clear, and exact description of the same, reference being had to the accompanying drawings, and to the letters of reference marked thereon, in which—

Figure 1, represents a side view of my improved faucet. Fig. 2, shows a longitudinal section through the same.

Similar letters of reference indicate like parts in both figures.

A, represents the tube of the faucet with a male screw turned on one end for attaching it to a cask or other like vessel from which liquor is to be drawn in small quantities, and about midway of this tube A, is a nozzle B, communicating with the bore of the tube.

C is a straight stem having on its end a circular india-rubber packing $a$, which fits tight against the shoulder $b$, and prevents leaking when the cock is closed. On the opposite end of the cock is a screw E, which is merely inserted into the end of the tube A, for covering up the hole.

The stem is operated so as to open and close the cock by means of a handle F, which passes through a slot G, made obliquely to the axis of the stem and slightly winding. On each side of this slot are raised lips $c$, $c$, against which the neck of the handle presses in opening and closing the cock. The handle plays freely in this slot and becomes a lever for operating the stem so that it can be removed with ease. The stem has a rocking motion or that similar to a screw, so that it can be driven up hard against the shoulder $a$, and effectually prevent any leakage.

The most important features attained in the application of the oblique slot to a faucet, is the ease with which the stem can be moved, and the simplicity and cheapness with which they can be made, at the same time not being liable to leak on account of the facility with which the straight stem has of being packed and the packing driven tight against the orifice in the tube.

What I claim as my invention and desire to secure by Letters Patent, is,

The arrangement and combination of the oblique slot G, handle F, stem C, and tube A, so that, on turning the handle F, the stem C, will rise and fall with a spiral or screw movement, thus insuring ease of operation and tightness of packing, as herein shown and described.

EUGÈNE DUCHAMP.

Witnesses:
R. S. SPENCER,
WM. TUSCH.